(12) United States Patent
Rowe

(10) Patent No.: US 10,975,457 B2
(45) Date of Patent: *Apr. 13, 2021

(54) IRON COBALT TERNARY ALLOY AND SILICA MAGNETIC CORE

(75) Inventor: Michael Paul Rowe, Pinckney, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/565,250

(22) Filed: Aug. 2, 2012

(65) Prior Publication Data

US 2014/0035713 A1  Feb. 6, 2014

(51) Int. Cl.
| | |
|---|---|
| H01F 27/24 | (2006.01) |
| H02K 1/02 | (2006.01) |
| B22F 3/12 | (2006.01) |
| C22C 33/02 | (2006.01) |
| H01F 1/00 | (2006.01) |
| B22F 1/00 | (2006.01) |
| B22F 9/24 | (2006.01) |
| C22C 1/04 | (2006.01) |
| B82Y 30/00 | (2011.01) |
| H01F 3/08 | (2006.01) |
| B22F 3/14 | (2006.01) |

(52) U.S. Cl.
CPC .......... *C22C 33/02* (2013.01); *B22F 1/0018* (2013.01); *B22F 9/24* (2013.01); *B82Y 30/00* (2013.01); *C22C 1/0433* (2013.01); *H01F 1/0054* (2013.01); *H01F 3/08* (2013.01); *B22F 3/14* (2013.01)

(58) Field of Classification Search
None
See application file for complete search history.

(56) References Cited

U.S. PATENT DOCUMENTS 3,614,893 A  10/1971 Nesbitt et al.
4,601,765 A   7/1986 Soileau et al.
(Continued)

FOREIGN PATENT DOCUMENTS

JP  3153838 A   7/1991
JP  3291335 A  12/1991
(Continued)

OTHER PUBLICATIONS

U.S. Appl. No. 13/558,397, filed Jul. 26, 2012, Rowe.
(Continued)

*Primary Examiner* — Ronak C Patel
(74) *Attorney, Agent, or Firm* — Oblon, McClelland, Maier & Neustadt, L.L.P.

(57) ABSTRACT

A magnetic core of superparamagnetic core shell nanoparticles having a particle size of less than 200 nm; wherein the core is an iron cobalt ternary alloy and the shell is a silicon oxide is provided. The magnetic core is a monolithic structure of superparamagnetic core grains of an iron cobalt ternary alloy directly bonded by the silicon dioxide shells. A method to prepare the magnetic core which allows maintenance of the superparamagnetic state of the nanoparticles is also provided. The magnetic core has little core loss due to hysteresis or eddy current flow.

9 Claims, 3 Drawing Sheets

(56) References Cited

U.S. PATENT DOCUMENTS

| | | | |
|---|---|---|---|
| 5,338,508 A | | 8/1994 | Nitta et al. |
| 6,051,324 A | * | 4/2000 | Moorhead et al. ............ 428/552 |
| 6,193,903 B1 | | 2/2001 | Gay et al. |
| 6,251,514 B1 | | 6/2001 | Lashrnore et al. |
| 6,551,659 B1 | * | 4/2003 | Clough .................. C23C 4/134 427/212 |
| 6,808,807 B2 | | 10/2004 | Anand et al. |
| 7,678,174 B2 | | 3/2010 | Tokuoka et al. |
| 2003/0077448 A1 | | 4/2003 | Ueta et al. |
| 2008/0087314 A1 | * | 4/2008 | Xiao et al. ................... 136/201 |
| 2008/0198302 A1 | | 8/2008 | Cho |
| 2010/0054981 A1 | | 3/2010 | Liu |
| 2010/0056366 A1 | * | 3/2010 | Lee ............................... 502/300 |
| 2010/0092384 A1 | * | 4/2010 | Bumb et al. .................. 424/1.29 |
| 2011/0098453 A1 | * | 4/2011 | Hyeon et al. ................. 530/415 |
| 2011/0104476 A1 | | 5/2011 | Toyoda et al. |
| 2011/0129763 A1 | * | 6/2011 | Lee et al. ..................... 429/532 |
| 2012/0229238 A1 | | 9/2012 | Hirota et al. |

FOREIGN PATENT DOCUMENTS

| | | |
|---|---|---|
| JP | 6342715 A | 12/1994 |
| JP | 2008-203848 A | 9/2008 |
| JP | 2011-119661 A | 6/2011 |

OTHER PUBLICATIONS

Shin Tajima, et al., "Properties of High-Density Magnetic Composite Fabricated From Iron Powder Coated with a New Type Phosphate Insulator" IEEE Transactions on Magnetics, vol. 41, No. 10, (p. 3280-3282), Oct. 2005.

H S Park, et al., "Synthesis of Silica-Coated Ferromagnetic Fine Powder by Heterocoagulation" J. Phys. Condens. Matter 20 (2008) 204105 (6 pg.).

A Bumb, et al., "Synthesis and Characterization of Ultra-Small Superparamagnetic Iron Oxide Nanoparticles Thinly Coated with Silica" Nanotechnology 19 (2008) 335601 (6 pg.).

U.S. Appl. No. 13/921,878, filed Jun. 19, 2013, Rowe.
U.S. Appl. No. 13/900,860, filed May 23, 2013, Rowe.
U.S. Appl. No. 13/942,116, filed Jul. 15, 2013, Rowe, et al.
U.S. Appl. No. 14/270,619, filed May 6, 2014, Rowe, et al.
U.S. Appl. No. 14/270,752, filed May 6, 2014, Rowe, et al.
U.S. Appl. No. 14/252,036, filed Apr. 14, 2014, Rowe, et al.
U.S. Appl. No. 14/296,917, filed Jun. 5, 2014, Rowe, et al.
U.S. Appl. No. 14/521,063, filed Oct. 22, 2014, Rowe, et al.

Office Action (Notice of Reasons for Rejection) dated May 23, 2017 in Japanese Patent Application No. 2013-109948 with English translation.

* cited by examiner

FeCoV/SiO2 nanoparticle synthesis using tetrabutylammonium chloride

TEM of FeCoV/SiO$_2$ nanoparticles

IRON COBALT TERNARY ALLOY AND SILICA MAGNETIC CORE

CROSS REFERENCE TO RELATED APPLICATIONS

Inventions by the present inventor related to the invention described herein are disclosed in U.S. patent application Ser. No. 13/529,316, filed Jun. 21, 2012, and in U.S. patent application Ser. No. 13/558,397, filed Jul. 26, 2012

BACKGROUND OF THE INVENTION

Field of the Invention

The present invention relates to a magnetic core having performance and stability properties which make the core particularly suitable for utility in power generation parts such as stators, rotors, armatures and actuators or any device whose function is dependent upon an efficient magnetic core, i.e., a magnetic core having minimal magnetic hysteresis and no or little eddy current formation.

Discussion of the Background

Magnetic materials generally fall into two classes which are designated as magnetically hard substances which may be permanently magnetized or soft magnetic materials which may be reversed in magnetism at low applied fields. It is important in soft magnetic materials that energy loss, normally referenced as "core loss" is kept to a minimum whereas in hard magnetic materials it is preferred to resist changes in magnetization. High core losses are therefore characteristic of permanent magnetic materials and are undesirable in soft magnetic materials.

Soft magnetic core components are frequently used in electrical/magnetic conversion devices such as motors, generators and transformers and alternators, particularly those found in automobile engines. The most important characteristics of soft magnetic core components are their maximum induction, magnetic permeability, and core loss characteristics. When a magnetic material is exposed to a rapidly varying magnetic field, a resultant energy loss in the core material occurs. These core losses are commonly divided into two principle contributing phenomena: hysteresis and eddy current losses. Hysteresis loss results from the expenditure of energy to overcome the retained magnetic forces within the core component. Eddy current losses are brought about by the production of induced currents in the core component due to the changing flux caused by alternating current (AC) conditions.

The use of powdered magnetic materials allows the manufacture of magnetic parts having a wide variety of shapes and sizes. Conventionally, however, these materials made from consolidated powdered magnetic materials have been limited to being used in applications involving direct currents. Direct current applications, unlike alternating current applications, do not require that the magnetic particles be insulated from one another in order to reduce eddy currents.

Conventionally, magnetic device parts are constructed from powders by compaction of the powders to a defined shape and then sintering the compact at temperatures of 600° C. or higher. Sintering the part following compaction, is necessary to achieve satisfactory mechanical properties in the part by providing particle to particle bonding and hence strength. However, sintering may cause volume changes and results in a manufacturing process with poor dimensional control.

In other conventional processes designed to prepare parts having minimum eddy current losses, the magnetic particles are coated with thermoplastic materials before pressing. The plastic is provided to act as a barrier between the particles to reduce induced eddy current losses. However, in addition to the relatively high cost of such coatings, the plastic has poor mechanical strength and as a result, parts made using plastic-coated particles have relatively low mechanical strength. Additionally, many of these plastic-coated powders require a high level of binder when pressed. This results in decreased density of the pressed core part and, consequently, a decrease in magnetic permeability and lower induction. Additionally, and significantly, such plastic coatings typically degrade at temperatures of 150-200° C. Accordingly, magnetic parts made in such manner are generally limited to utility in low stress applications for which dimensional control is not critical.

Thus, there remains a need for magnetic powders to produce soft magnetic parts, having increased green strength, high temperature tolerance, and good mechanical properties, which parts have minimal or essentially no core loss.

Conventionally, ferromagnetic powders have been employed for the production of soft magnetic core devices. Such powders are generally in a size range measured in microns and are obtained by a mechanical milling diminution of a bulk material. Superparamagnetic nanoparticle materials having particle size of less than 100 nm have found utility for magnetic record imaging, as probes for medical imaging and have been applied for targeted delivery of therapeutic agents. However, the utilization of superparamagnetic powders for production of core magnetic parts has until now, been limited.

For example, Toyoda et al. (U.S. 2011/0104476) describe a soft magnetic material of iron or an iron alloy particle having a grain size of from 5 to 400 μm which is provided with an oxide insulative coating including silicon oxide. The coated particles are mixed with an organic substance which is a non-thermoplastic resin and at least one of a thermoplastic resin and a higher fatty acid. The content of the organic substance in the mixed material is from 0.001 to 0.2% by mass. The mixed material is compression molded and then subjected to a heat treatment at a temperature between the glass transition temperature and the thermal decomposition temperature of the non-thermoplastic resin. The molded and heat treated structure is indicated to be useful for electric and electronic components such as a motor core or a transformer core.

Anand et al. (U.S. Pat. No. 6,808,807) describes encapsulated ferromagnetic powders obtained by coating a ferromagnetic core with a polyorganosiloxane or polyorganosilane and thermally treating the coated core to convert the polymer to a residue containing silicon and oxygen. The core alloy may be any of iron alloyed with silicon, aluminum, nickel, cobalt, boron, phosphorous, zirconium, neodymium and carbon. Ferromagnetic core particles having an average diameter of less than 2 mm are suitable for this composition. A plurality of the particles may be compacted to a desired shape. Hot isostatic pressing as a method of compaction is described.

Lashmore et al. (U.S. Pat. No. 6,251,514) describes a ferromagnetic powder containing particles of about 40 to 600 microns. Examples of the ferromagnetic material include carbon steel, tungsten steel, Vicalloy (Fe/Co/V alloy) and iron powder. The particles are coated with a combination of an iron oxide and another iron oxate salt such as iron chromate. Compaction followed by annealing provides soft magnetic parts.

Gay et al. (U.S. Pat. No. 6,193,903) describes ceramic coated ferromagnetic powders. The powders are iron or an iron alloy and the encapsulating layer on the particle may be one of a group of ceramics such as a metal oxide, metal nitride, metal silicate and a metal phosphate. The particle size is from 5 to 1000 microns. Silica is listed as one of a large group of ceramic materials suitable as the coating. The powders may be compacted to form a magnetic article. Inclusion of a polymer or lubricant is described in the compaction and the unit is then annealed.

Liu (U.S. 2010/0054981) describes a system of magnetic nanoparticles which is a composite of a hard magnetic material and a soft magnetic material. For example, a "bimagnetic" $FePt/Fe_3O_4$ nanoparticle is described. Liu describes "warm compaction of the material to produce a bulk nanocomposite magnet.

Ueta et al. (U.S. 2003/0077448) describes a ferromagnetic raw metal powder (primarily iron) having a coating of various oxide materials including silicon. Claim 1 provides a ferromagnetic powder which is surface coated with a silicone resin and a pigment. The coated particle has a diameter on the order of 100 microns. Warm pressing of the powder to produce a core is described as well as annealing of a core at elevated temperature.

Tokuoka et al. (U.S. Pat. No. 7,678,174) describe an iron based powder particle having an iron or iron alloy core and an oxide type insulating coating, including silicon oxide. An ester wax is also added to the particle surface. The coated powder particles are on the order of 200 microns in size as described in Example 1. The lubricated powder is pressure molded to form a molded body and the molded body heat treated.

Soileau et al. (U.S. Pat. No. 4,601,765) describes a core obtained by compaction of iron powder which has been coated with an alkali metal silicate and then a silicone resin polymer. The iron particles to which the coating is applied have a mean particle size of 0.002 to 0.006 inches. The core is prepared by compaction of the powder at greater than 25 tons per square inch and then annealing the pressed component.

Tajima et al. (IEEE Transactions on Magnetics, Vol. 41, No. 10, October, 2005) describes a method to produce a powder magnetic core described as warm compaction using die wall lubrication (WC-DWL). According to the method an iron powder coated with a phosphate insulator was compacted under a pressure of 1176 MPa at a temperature of 423° K to produce a core type structure.

Moorhead et al. (U.S. Pat. No. 6,051,324) describes particles of an alloy of iron/cobalt/vanadium having a particle size of less than 44 microns (325 mesh) which are coated with a glass, a ceramic or a ceramic glass, including silicon dioxide. Densification of the material by sintering under pressure is described as well as hot compression to form disks. The formation of strong bonds between the glass ceramic including $SiO_2$ and the metal alloys under warm compression is disclosed.

Nitta et al. (U.S. Pat. No. 5,338,508) describes an Iron-Cobalt-Vanadium-type powder having an average particle diameter of 20 microns or less which is suitable for injection molding. The particles are obtained by atomization of the melted alloy. Nitta describes that a film of $SiO_2$ on the particle surface prohibits formation of a desired spherical form. The particles are injection molded employing organic binders.

Mamiya et al. (JP 06-342715) describes compression molding of a iron-cobalt-vanadium alloy powder by coating the powder with a silicone resin. The compressed green body is subsequently heat treated and during this treatment the resin is converted to $SiO_2$. The alloy powder was prepared by an atomization method and has a mean particle size of 50 μm.

Tsurumaki et al. (JP 03-291335) (Abstract) describes forming a green compact of an atomization method prepared powder of an iron-cobalt-vanadium alloy. The green body is calcined and dewaxed, then recompacted and sintered.

Yamada et al. (JP 03-153838) (Abstract) describes surface treatment of an iron/cobalt/vanadium powder with a compound containing silicon and an alkoxy group (such as vinyl triethoxysilane). No description of particle size or method to produce the alloy particle is provided. The powder is molded or extruded with addition of a thermoplastic resin and the formed green body is degreased and sintered.

Park et al. (J. Phys.: Condens. Matter 20 (2008) 204105) describes the synthesis of nanoparticles of a temperature sensitive ferrite, the ferrite being an alloy of iron/calcium/nickel/zinc. The particles are coated with a silica shell by treatment with TEOS at alkaline pH. Use of the coated particles for a magnetic fluid is described.

Bumb et al. (Nanotechnology, 19, 2008, 335601) describes synthesis of superparamagnetic iron oxide nanoparticles of 10-40 nm encapsulated in a silica coating layer of approximately 2 nm. Utility in power transformers is referenced, but no description of preparation of core structures is provided.

None of the above references disclose or suggest a monolithic magnetic core constructed by heated compression of a nanoparticular iron cobalt ternary alloy encapsulated in a silicon dioxide coating shell, wherein the particles are directly compacted without addition of lubricant or other material to facilitate particle adherence.

SUMMARY OF THE INVENTION

An object of the present invention is to provide a magnetic powder to produce soft magnetic parts, having increased green strength, high temperature tolerance, and good mechanical properties, which parts have minimal or essentially no core loss.

A second object of the invention is to provide a magnetic core having little or no core loss and a third object is to provide a method to produce a magnetic core or shaped core part having little or no core loss.

These and other objects have been achieved according to the present invention, the first embodiment of which provides a magnetic core, comprising:

core shell nanoparticles particles having a particle size of 2 to 200 nm;

wherein the core is an iron cobalt ternary alloy and the shell is a silicon oxide and the magnetic core is a monolithic structure of superparamagnetic core grains of iron cobalt ternary alloy directly bonded by the silicon oxide shells.

In a second embodiment according to the invention, a space between the individual superparamagnetic nano iron cobalt ternary alloy particles of the core is occupied substantially only by the silicon oxide, and in a preferred embodiment, the silicon oxide is silicon dioxide.

In a preferred embodiment according to the invention, the third component of the iron cobalt ternary alloy is selected from the group consisting of scandium, titanium, vanadium, chromium, manganese, nickel, copper and zinc.

In a highly preferred embodiment, according to the present invention, the iron cobalt ternary alloy is an iron cobalt vanadium alloy.

In another highly preferred embodiment according to the present invention, the iron cobalt ternary alloy is an iron cobalt chromium alloy.

In a further embodiment, the present invention provides a method to prepare a monolithic magnetic core, the magnetic core comprising superparamagnetic core shell particles having a particle size of less than 200 nm; wherein the core consists of superparamagnetic iron cobalt ternary alloy and the shell consists of silicon dioxide; the method comprising sintering superparamagnetic core shell particles having a particle size of less than 200 nm under pressure under flow of an inert gas to obtain a monolithic structure; wherein the core of the core shell particle consists of superparamagnetic iron cobalt ternary alloy and the shell consists of silicon dioxide.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION OF THE INVENTION

Applicant has recognized that to increase magnetic core efficiency as measured in terms of core loss, the magnetic core must demonstrate a reduced measure of magnetic hysteresis as well as lowered eddy current formation. Applicant has surprisingly discovered that by producing superparamagnetic iron cobalt ternary alloy nanoparticles that are encapsulated in silica shells and then compacting and sintering these nanoparticles into a monolithic nanomaterial core, the core obtained has zero (or very low) hysteresis and very low eddy current formation because of the insulating silica shells.

According to the invention, the iron cobalt ternary alloy nanoparticle grains are of or approaching the size of the single particle magnetic domain of the iron cobalt ternary alloy and thus are superparamagnetic. While not being constrained to theory, Applicant believes control of grain size to approximately that of the particle magnetic domain is a factor which contributes to the reduced hysteresis of a magnetic core according to the present invention. Moreover, the presence of insulating silica shells about the core grains is a factor which contributes to the low eddy current formation of a magnetic core according to the present invention.

Figure 3:
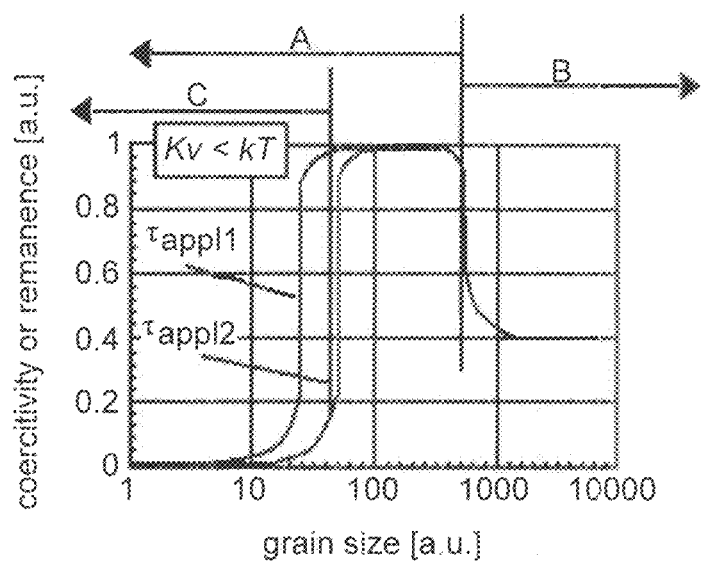
FIG. 3 shows a generalized relationship of particle size and range of superparamagnetism.

It is conventionally known that the range of particle size for which single domain particles exhibit superparamagnetism has an upper boundary characteristic of the particle chemical constitution. This phenomenon is shown in FIG. 3 which is reproduced from Nanomaterials An Introduction to Synthesis, Properties and Applications by Dieter Vollath (page 112) Wiley-VCH. According to FIG. 3, above a certain size range, nanoparticles will exhibit a measurement time dependency characteristic of ferromagnetic behavior. To avoid this time dependency nanoparticles of a size within the range of superparamagnetism must be prepared and maintained.

Thus, the first embodiment of the invention is a magnetic core, comprising: core shell nanoparticles having a particle size of less than 200 nm; wherein the core is an iron cobalt ternary alloy and the shell is a silicon oxide and the magnetic core is a monolithic structure of superparamagnetic core grains of an iron cobalt ternary alloy directly bonded by the silicon oxide shells. Preferably the particle size is from 2 to 200 nm and more preferably from 2 to 160 nm and most preferably from 5 to 30 nm. These ranges include all subranges and values there between.

The core according to the present invention is monolithic, having the space between the iron cobalt ternary alloy nanoparticle grains occupied by the silicon oxide. Preferably at least 97% of the space between the grains, preferably 98% and most preferably 100% of the space is silicon oxide and further most preferably the silicon oxide is silicon dioxide. According to the present invention neither any binder nor any resin is contained in the matrix of the monolithic core.

The monolithic core according to the present invention is obtained by a process comprising sintering a powder of superparamagnetic core shell particles having a particle size of less than 200 nm under pressure under flow of an inert gas to obtain a monolithic structure; wherein the core of the core shell particle consists of superparamagnetic iron cobalt ternary alloy and the shell consists of silicon dioxide. Because a magnetic material is only superparamagnetic when the grain size is near or below the magnetic domain size, the nanoparticle core must be maintained as small as possible, or the sample will become ferromagnetic, and express magnetic hysteresis. Therefore, the most mild and gentle sintering conditions that still yield a monolithic sample that is robust enough to be machined into a toroid are desired, because more aggressive sintering conditions will promote unwanted grain growth and potentially, loss of superparamagnetic performance.

Having generally described this invention, a further understanding can be obtained by reference to certain specific examples which are provided herein for purposes of illustration only and are not intended to be limiting unless otherwise specified. Skilled artisans will recognize the utility of the devices of the present invention as a battery as well as the general utility of the electrolyte system described herein.

EXAMPLES

Example 1

To a reaction flask was added 1050 mL ethanol, 2.056 g NaOH, and 145.102 g tribasic sodium citrate. After the sodium hydroxide had an opportunity to dissolve, 20.967 g iron dichloride tetrahydrate, 23.786 g cobalt dichloride hexahydrate, and 0.695 g vanadium trichloride were dissolved in the reaction mixture.

24.301 g sodium borohydride were dissolved in 900 mL of ethanol.

The sodium borohydride solution was then added to the reaction. The reaction was allowed to stir for 10 additional minutes after all of the sodium borohydride was added.

The product was then purified using a washing solution of 70% H$_2$O/30% ethanol (by volume).

The nanoparticles were stirred for 20 minutes to fully disperse them throughout a water/triethylamine solution (1260 mL H$_2$O and 33 mL triethylamine). 3.3 mL tetraethyl orthosilicate was then dissolved in 780 mL ethanol, and added to the stirring reaction flask. After 20 additional minutes of stirring, the product was again collected using a permanent magnet. This final core/shell product was washed with ethanol.

Figure 1:
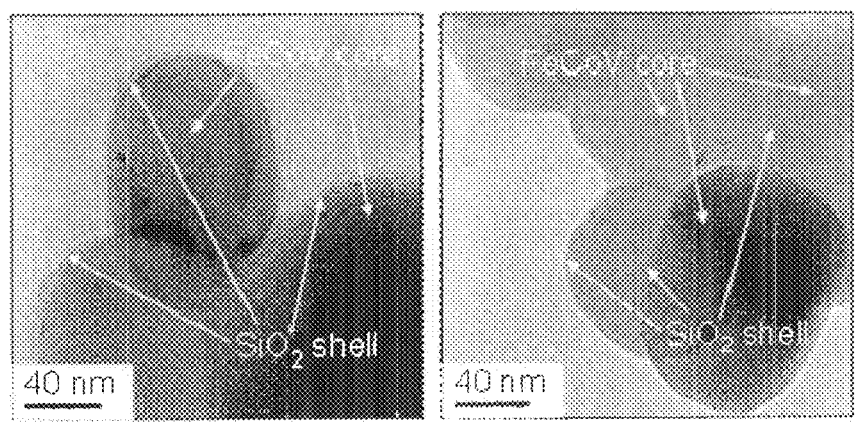
FIG. 1 shows a TEM image of nanoparticles prepared in Example 1.

A TEM image of the nanoparticles is shown in FIG. 1. The image indicates that nanoparticles of less than 150 nm were obtained.

Example 2

To a reaction flask was added 1050 mL ethanol, 1.0 g NaOH, and 11.96 g tetrabutylammonium chloride. After the sodium hydroxide had an opportunity to dissolve, 20.967 g iron dichloride tetrahydrate, 23.786 g cobalt dichloride hexahydrate, and 0.695 g vanadium trichloride were dissolved in the reaction mixture.

24.301 g sodium borohydride were dissolved in 900 mL of ethanol.

The sodium borohydride solution was then added to the reaction. The reaction was allowed to stir for 10 additional minutes after all of the sodium borohydride was added.

The product was then purified using a washing solution of 70% H$_2$O/30% ethanol (by volume).

The nanoparticles were stirred for 20 minutes to fully disperse them throughout a water/triethylamine solution (1260 mL H$_2$O and 33 mL triethylamine). 3.3 mL tetraethyl orthosilicate was then dissolved in 780 mL ethanol, and added to the stirring reaction flask. After 20 additional minutes of stirring, the product was again collected using a permanent magnet. This final core/shell product was washed with ethanol.

Figure 2:
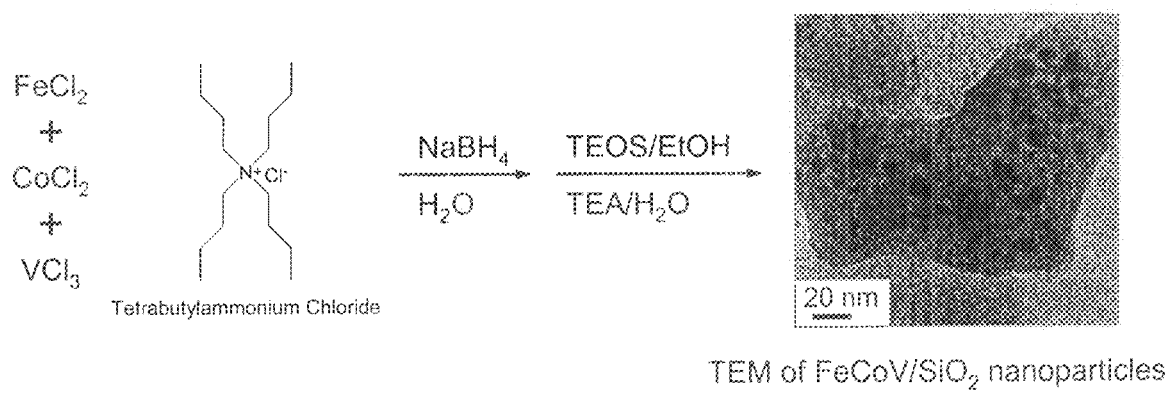
FIG. 2 shows a TEM image of nanoparticles prepared in Example 2.

A TEM image of the nanoparticles is shown in FIG. 2. The image indicates that clusters of core/shell nanoparticles of less than about 175 nm were obtained. The clusters contained magnetic nanoparticles having cores of less than 30 nm and silica shells of less than 10 nm in thickness.

Toroid and Inductor Fabrication

The product of the hot press sintering is a disc. The size of the disk is dependent upon the size of punch and die set used. As described here but not limiting the dimensions of those stated, discs were produced that were 9 mm in diameter and 2.5 mm thick. The disc was converted to a toroid through conventional machining techniques. The fabricated toroid was hand-wound with copper enameled wire to produce a functional inductor.

The invention claimed is:

1. A magnetic core, comprising:
   core shell nanoparticles;
   wherein
   the core is an iron cobalt ternary alloy and the shell is a silicon oxide,
   the third component of the ternary alloy is a transition metal selected from the group consisting of scandium, titanium, vanadium, chromium, manganese, nickel, copper and zinc,
   the magnetic core is a monolithic structure of superparamagnetic core grains of the iron cobalt ternary alloy having a particle size of 5 to 30 nm directly bonded by the silicon oxide shells, which form a silica matrix, and
   the magnetic core is superparamagnetic.
2. The magnetic core according to claim 1, wherein a space between individual superparamagnetic nano iron cobalt ternary alloy particles is occupied substantially only by the silicon oxide.
3. The magnetic core according to claim 1, wherein the iron cobalt ternary alloy is an iron cobalt vanadium alloy.
4. The magnetic core according to claim 1, wherein the iron cobalt ternary alloy is an iron cobalt chromium alloy.
5. The magnetic core according to claim 1, wherein the silicon oxide is silicon dioxide.
6. The magnetic core according to claim 5, wherein at least 97% by volume of the space between the iron cobalt ternary alloy grains is occupied by silicon dioxide.
7. An electrical/magnetic conversion device, which comprises the magnetic core according to claim 1.
8. A vehicle part comprising the electrical/magnetic conversion device according to claim 7, wherein the part is selected from the group consisting of a motor, a generator, a transformer, an inductor and an alternator.
9. A method to prepare the monolithic magnetic core of claim 1,
   comprising:
   sintering the superparamagnetic core shell particles under heat and pressure under flow of an inert gas to obtain the monolithic structure;
   wherein the monolithic core is superparamagnetic.

* * * * *